(12) United States Patent
Chang et al.

(10) Patent No.: US 12,438,911 B2
(45) Date of Patent: Oct. 7, 2025

(54) DOMAIN NAME PROCESSING SYSTEMS AND METHODS

(71) Applicant: Proofpoint, Inc., Sunnyvale, CA (US)

(72) Inventors: Hung-Jen Chang, Fremont, CA (US); Ali Mesdaq, San Jose, CA (US); Gaurav Dalal, Fremont, CA (US); Kevin Dedon, Austin, TX (US)

(73) Assignee: PROOFPOINT, INC., Sunnyvale, CA (US)

( * ) Notice: Subject to any disclaimer, the term of this patent is extended or adjusted under 35 U.S.C. 154(b) by 0 days.

(21) Appl. No.: 18/626,314

(22) Filed: Apr. 3, 2024

(65) Prior Publication Data

US 2024/0267411 A1 Aug. 8, 2024

Related U.S. Application Data

(63) Continuation of application No. 17/212,997, filed on Mar. 25, 2021, now Pat. No. 11,973,799.

(60) Provisional application No. 63/074,940, filed on Sep. 4, 2020.

(51) Int. Cl.
| | |
|---|---|
| *G06F 16/00* | (2019.01) |
| *G06F 40/205* | (2020.01) |
| *G06F 40/279* | (2020.01) |
| *H04L 9/40* | (2022.01) |
| *H04L 61/30* | (2022.01) |
| *H04L 61/4511* | (2022.01) |

(52) U.S. Cl.
CPC ........ *H04L 63/1483* (2013.01); *G06F 40/205* (2020.01); *G06F 40/279* (2020.01); *H04L 61/3005* (2013.01); *H04L 61/4511* (2022.05)

(58) Field of Classification Search
None
See application file for complete search history.

(56) References Cited

U.S. PATENT DOCUMENTS 11,665,135 B2 * 5/2023 Nguyen ............. H04L 61/3025
709/245
11,973,799 B2 * 4/2024 Chang .................. G06F 40/279

* cited by examiner

*Primary Examiner* — Tuankhanh D Phan
(74) *Attorney, Agent, or Firm* — Sprinkle IP Law Group

(57) ABSTRACT

A domain processing system is enhanced with a first-pass domain filter configured for loading character strings representing a pair of domains consisting of a seed domain and a candidate domain in a computer memory, computing a similarity score and a dynamic threshold for the pair of domains, determining whether the similarity score exceeds the dynamic threshold, and iterating the loading, the computing, and the determining for each of a plurality of candidate domains paired with the seed domain. A similarity score between the seed domain and the candidate domain and a corresponding dynamic threshold for the pair are computed. If the similarity score exceeds the corresponding dynamic threshold, the candidate domain is provided to a downstream computing facility. Otherwise, it is dropped. In this way, the first-pass domain filter can significantly reduce the number of domains that otherwise would need to be processed by the downstream computing facility.

20 Claims, 7 Drawing Sheets

```
sim_score( sun , locasuna ) = 0
is_passed_th = 0.7911428571428571
is_passed = false sim_score( 800flowers , 1800flowers ) = 0.6620342857142857
is_passed_th = 0.6365714285714286
is_passed = true sim_score( victoriassecret , vitoriasecreta ) =
0.7250285714285714   is_passed_th = 0.6971428571428571
is_passed = true sim_score( wellsfargo , wellsfago ) = 0.6462857142857144
is_passed_th = 0.6214285714285714
is_passed = true sim_score( dwr , 1000poetryandwritingcontests ) = 0
is_passed_th = 0.8031428571428572
is_passed = false sim_score( premiumoutlets , brewsbrothers ) = 0.4285714285714285
is_passed_th = 0.581999999999999
is_passed = false sim_score( vha , mizunova ) = 0                                    ← 511
is_passed_th = 0.7911428571428571
is_passed = false sim_score( wsj , vvsj ) = 0.7440457142857142                       ← 501
is_passed_th = 0.7154285714285713
is_passed = true sim_score( robinhood , robindahood ) = 0.6620342857142857
is_passed_th = 0.6365714285714286
is_passed = true
```

DOMAIN NAME PROCESSING SYSTEMS AND METHODS

CROSS-REFERENCE TO RELATED APPLICATIONS

This application is a continuation of, and claims a benefit of priority under 35 U.S.C. § 120 from, U.S. patent application Ser. No. 17/212,997, filed Mar. 25, 2021, issued as U.S. Pat. No. 11,973,799, entitled "DOMAIN NAME PROCESSING SYSTEMS AND METHODS," which claims a benefit of priority under 35 U.S.C. § 119 (e) from U.S. Provisional Application No. 63/074,940, filed Sep. 4, 2020, entitled "DOMAIN NAME PROCESSING SYSTEMS AND METHODS," both of which are incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates generally to the field of digital risk detection. More particularly, this disclosure relates to high-efficiency domain name processing systems and methods useful for quickly and efficiently identifying domains for digital risk analysis and detection, with significantly reduced time and computational power that otherwise would be required to process an enormous number of domains on the Internet.

BACKGROUND OF THE RELATED ART

Trademark dilution refers to a trademark law concept giving the owner of a famous trademark standing to forbid others from using that mark in a way that would lessen its uniqueness. Unfortunately, with the advent of the Internet, it has become extremely difficult to spot potential trademark infringers, not the least of which is due to the sheer number of domains on the Internet.

Today, there are hundreds of millions of registered domains on the Internet. New domain names are added to this number on a daily basis. In this case, a "domain name" generally refers to an identification string that defines a realm of administrative autonomy, authority, or control within the Internet. Domain names, which are referred to as "domains" herein, may be formed by the rules and procedures of the Domain Name System (DNS), which is known to those skilled in the art as a hierarchical and decentralized naming system for computers, services, or other resources connected to the Internet or a private network.

Domain names are organized in subordinate levels (subdomains) of the DNS root domain, which is nameless. The first-level set of domain names are the top-level domains (TLDs), including the generic top-level domains (gTLDs), such as the prominent domains com, info, net, edu, and org, and the country code top-level domains (ccTLDs).

Domain names are used in various networking contexts and application-specific naming and addressing purposes. In general, a domain name represents a numerical Internet Protocol (IP) resource, such as a computer used to access the Internet, a server computer hosting a web site, or the web site itself or any other service communicated via the Internet. The DNS translates a domain name to a numerical IP address needed for locating and identifying computer services and devices with the underlying network protocols. To this end, organizations may choose a domain name that corresponds to their name (or brand) to establish a unique identity so that Internet users can recognize and reach them through their websites easily. In this context, a brand can be a name, trademark, term, design, symbol, or other feature that distinguishes an entity (e.g., organization, product, etc.) from its rivals or competitors in the eyes of others (e.g., consumers).

To confuse end users and/or profit from the goodwill of a certain domain, brand, or trademark belonging to someone else, attackers and bad actors alike may try to register domain names that are similar to that certain brand, domain, or trademark. Such spoofed domain names may often contain the name of the brand or a word similar to the brand name. Another tactic that may be used for attacking or otherwise malicious purposes is to include an auxiliary term or terms in a domain so that it appears to be connected to the brand. For example, a spoofed domain for a bank may also include the words "financial" or "investment" in addition to the name of the bank. As another example, a spoofed domain for a brand may include other trademarks of the brand.

Thus, it is desirable for an organization to protect their domain(s) by looking for suspicious ones that appear to spoof their domain(s). However, looking for a spoofed domain from hundreds of millions of domains on the Internet is akin to looking for a needle in a haystack. Consequently, there is room for technical innovations and improvements.

SUMMARY OF THE DISCLOSURE

Embodiments disclosed herein provide systems and methods implementing a new domain processing solution (referred to herein as a "domain filter") that can quickly and efficiently filter down registered domains that can be found on the Internet (referred to herein as "candidate domains") against domains of interest (referred to herein as "seed domains"). A seed domain can be any domain of interest that is the subject of domain protection (e.g., from trademark dilution, domain fraud, etc.).

The domain filter is operable to process a seed domain and each candidate domain and determine whether the candidate domain is related to the seed domain. In some embodiments, the domain filter loads a seed domain for each of a plurality of candidate domains in memory, computes a similarity score and a corresponding threshold between the seed domain and the respective candidate domain. If the similarity score is less than the threshold thus dynamically computed, the candidate domain is considered not related to the seed domain. In such a case, the (candidate domain, seed domain) pair is removed as input to a downstream computing facility such as a user interface or an analytical module operating in an enterprise computing environment.

A previous approach to domain name processing analyzes characters in a domain seed string and a candidate string and measures an n-gram distance between the two strings. This n-gram distance approach has a big-O $N^2$ time complexity. In comparison, the similarity score calculation function uses both characters and position indices of characters in two strings as input variables. In terms of run-time performance, the similarity score approach disclosed herein has a big-O linear complexity, which is significantly more efficient than the previous approach. Further, while the n-gram distance approach can filter out perhaps 99 percent of candidate domains, when the amount of candidate domains is massive (e.g., one billion), one percent can mean one million candidate domains that are considered by the n-gram distance approach as being similar or close to a seed domain. This similarity scoring approach disclosed herein increases the accuracy of identifying candidate domains that are truly similar and can filter out an additional 84% or more candidate domains than the n-gram distance approach, leaving about average 30,000 candidate domains per a seed domain for further processing. As a non-limiting example of a comparison, suppose the number of (candidate domain, seed domain) pairs from the output of similarity scoring approach is 630,275,475; the number of (candidate domain, seed domain) pairs from the output of n-gram distance approach would be 3,978,486,432.

In some embodiments, the domain filter may be run on a mobile device, a laptop computer, or a tablet computer. The domain filter may access an internet domain database, retrieve a set of candidate domains from the internet domain database, and load each candidate domain character string of the set of candidate domains in a computer memory. The domain filter may access a seed domain database to retrieve a seed domain character string of a seed domain and load the seed domain character string in the computer memory for each computation against a candidate domain character string.

In some embodiments, the method may further include computing a similarity score and a corresponding dynamic threshold, comparing the similarity score and the dynamic threshold, and determining whether the similarity score exceeds the dynamic threshold thus computed. If the similarity score exceeds the dynamic threshold, the candidate domain represented by the candidate domain character string is considered as related to the seed domain represented by the seed domain character string. Otherwise, the candidate domain represented by the candidate domain character string is not considered as related to the seed domain represented by the seed domain character string and the particular pair of seed domain and candidate domain is discarded.

Through this process, the method can quickly and efficiently identify/isolate seed domain-candidate domain pairs that are similar enough for further processing, for instance, by a downstream computing facility. The downstream computing facility can include, for instance, a user interface (UI), an edit distance analyzer, or an analytical module running on a computer operating in an enterprise computing environment.

One embodiment may comprise a system having a processor and a memory and configured to implement the method disclosed herein. One embodiment may comprise a computer program product that comprises a non-transitory computer-readable storage medium which stores computer instructions that are executable by a processor to perform the method disclosed herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIG. 5 shows non-limiting examples of similarity scores and corresponding thresholds dynamically generated according to some embodiments.

DETAILED DESCRIPTION

Figure 1:
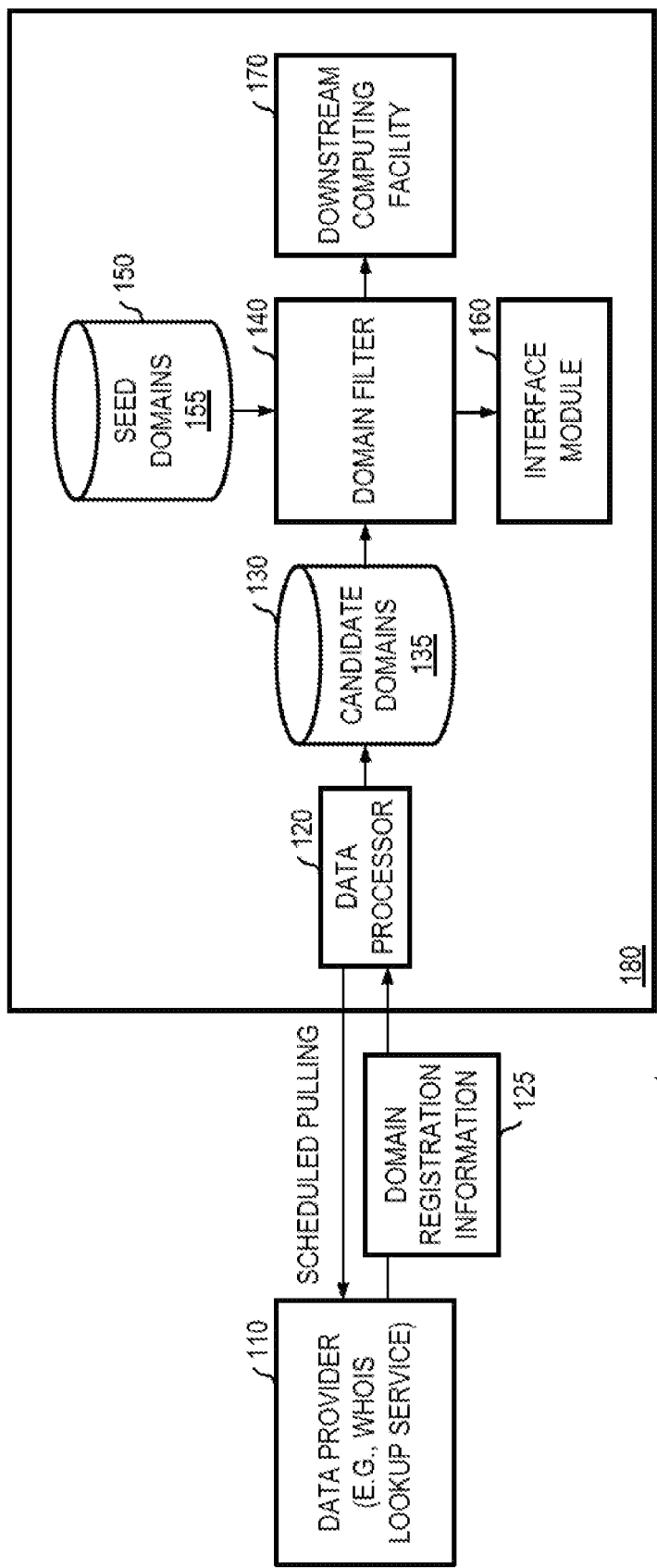
FIG. 1 depicts a diagrammatic representation of a computing environment where embodiments disclosed herein can be implemented.

The invention and the various features and advantageous details thereof are explained more fully with reference to the exemplary, and therefore non-limiting, embodiments that are illustrated in the accompanying drawings and detailed in the following description. Descriptions of known programming techniques, computer software, hardware, operating platforms, and protocols may be omitted so as not to unnecessarily obscure the disclosure in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

As alluded above, currently, there are hundreds of millions of domains on the Internet. Thus, whenever there is a need to process (e.g., classify, categorized, etc.) domains on the Internet, a huge cost in time and money is needed to process all of them. To reduce the number of domains that would need to be processed, a domain filter is needed to avoid unnecessary machine computation. For example, suppose a digital risk detection system analyzes over 300 million domains every day. It would be extremely time-consuming and costly (e.g., in terms of computational resources and money) to process every single domain of the 300 million domains on a daily basis.

Further complicating the matter is that each of the 300 million or more domains may be processed at least twice, once in a lab or test environment and once in a production environment, bringing the total number of domains under analysis to well over half a billion. Suppose it takes one second for a human to look at the domain and decide how the domain is to be classified, it will take that person more than 15 years to classify all of over half a billion domains.

Using machines can reduce the processing time to a 24-hour period, for example, by using a distance metric such as edit distance or Levenshtein Distance to find similarity in domain names. However, this is an expensive computation. The standard Levenshtein distance computation is by a dynamic algorithm with time complexity $O(n*m)$ and space complexity $O(n*m)$, where n and m are the lengths of the two strings.

Additionally, attempts have been made to generate typosquatting-type domains and use same to detect spoofed domains on the internet. However, these methods are also very expensive in terms of time, computational power, and costs.

Domain filters can help to reduce the number of domains that would need to be processed and, in doing so, can make domain processing more efficient and/or effective. For instance, a domain filter can help to avoid or reduce unnecessary machine computation by eliminating domains that are not relevant to a domain of interest, referred to herein as a "seed domain," which is subject to domain protection (e.g., domain protection from trademark dilution, domain fraud, etc.). However, eliminating domains that are not relevant to a seed domain still requires the processing of all domains on the Internet.

To this end, embodiments disclosed herein provide domain processing systems and methods that can quickly, efficiently, and effectively filter down the hundreds of millions of domains on the Internet as a first pass to reduce the number of candidate domains that must be processed against each seed domain. An example of a domain processing system 180 is illustrated in FIG. 1.

In the example of FIG. 1, domain processing system 180 is communicatively connected to a data provider 110. Data provider 110 may provide a "WHOIS" lookup service in a network environment 100. WHOIS is a query and response protocol that can be used for querying databases that store the registered users or assignees of an Internet resource, such as a domain name, an IP address block, or an autonomous system.

Domain processing system 180 may include a data processor 120 that is configured for pulling or requesting data provider 110 on a configurable time interval. In response, data provider 110 may return domain registration information 125 containing key-value pairs, a portion of which is provided below as a non-limiting example.

```
{"standardRegCreatedDateOriginal": "2017-09-11 00:00:00 UTC",
"technicalContact_email": "", "registrant_telephone": ""
"billingContact_organization": "", "status": "addPeriod",
"whoisServer": "whois.nic.fr", "zoneContact_telephoneExt": "",
"nameServers": "", "administrativeContact_telephoneExt": "",
"billingContact_email": "", "registrarInfo": "1&1 Internet SE",
"registrant_state": "", "zoneContact_name": "",
"administrativeContact_postalCode": "", "zoneContact_state": "",
"billingContact_country": "", "billingContact_postalCode": "",
"zoneContact_organization": "", "registrant_email": "",
"registrant_rawText": "", "contactEmail": "",
"administrativeContact_country": "FRANCE", "updatedDateOriginal": "",
"technicalContact_telephone": "", "billingContact_telephone": "",
"Audit_auditUpdatedDate": "2017-09-12", "zoneContact_street2": "",
"standardRegUpdatedDateOriginal": "", "billingContact_rawText": "",
"registrarName": "", "zoneContact_telephone": "",
"zoneContact_country": "", "registrant_name": "",
"billingContact_faxExt": "", "registrant_telephoneExt": "",
"standardRegUpdatedDate": "", "technicalContact_street1": "",
"technicalContact_fax": "", "zoneContact_street3": "",
"technicalContact_state": "", "expiresDateOriginal": "11/09/2018",
"technicalContact_postalCode": "", "WhoisRecord_rawText": "",
"registrant_country": "FRANCE", "registrant_faxExt": "",
"zoneContact_faxExt": "", "zoneContact_email": "",
"administrativeContact_email": "", "registrant_city": "",
"billingContact_telephoneExt": "", "RegistryData_rawText": "%%|%% This
is the AFNIC Whois server. |%%|%% complete date format : DD/MM/YYYY|%%
short date format : DD/MM|%% version : FRNIC-2.5|%%|%%
Rights restricted by copyright. |%% See
https://www.afnic.fr/en/products-and-services/services/whois/whois-
special-notice/|%%|%% Use '-h' option to obtain more information about
this service. |%%|%% [213.87.240.199 REQUEST] >> startmynet.fr |%%|%%|%% RL
Net [##########] – RL IP
[#########.] |%%| |domain: domainname.fr|status: ACTIVE ...",
...}
```

Data processor 120 is operable to process domain registration information 125 provided by data provider 110 to extract the universal resource locators (URLs) and store the URLs as candidate domains 135 in an Internet domain database 130. In some cases, in addition to URLs, other information such as the registrant's name, company, email address, etc. may also be extracted from domain registration information 125 and stored in Internet domain database 130.

In some embodiments, data processor 120 can query data provider(s) 110 for all the registered domains on the Internet. In some embodiments, data processor 120 can query data provider 110 for any new domain registered since the last pulling (i.e., getting the delta). Querying data provider 110 can be done based on a configurable time schedule, for example, on a daily basis.

In some embodiments, Internet domain database 130 may implement a relational database system. In some embodiments, Internet domain database 130 may implement an Apache Cassandra™ database available from the Apache Software Foundation.

In some embodiments, domain filter 140 is operable to review candidate domains 135 stored in Internet domain database 130 (e.g., on a configurable time interval such as daily) against one or more seed domains 155 stored in a seed domain database 150. In one embodiment, domain filter 140 is operable to review 300 million or more candidate domains stored in Internet domain database 130 on a daily basis against a set of seed domains. In one embodiment, domain filter 140 is operable to review the delta (e.g., about 20,000 URLs associated with newly discovered candidate domains) received from data provider 110 on a daily basis against a set of seed domains. For each respective seed domain 155, domain filter 140 is operable to filter down the number of candidate domains 135 that might be considered as similar or close to the respective seed domain 155 based on a new approach referred to herein as a similarity scoring and dynamic thresholding approach.

As discussed further below, in some embodiments, domain filter 140 is operable to compare the similarity of each candidate domain 135 to seed domain 155 and generate a similarity score. Additionally, domain filter 140 is operable to compute a corresponding dynamic threshold dynamically. The threshold is for comparing the particular seed domain 155 and the particular candidate domain 135. In some embodiments, the similarity score and the corresponding threshold are stored in a computer memory.

In some embodiments, the thresholding process is performed dynamically and no predetermined thresholds are used. In some embodiments, each pair of a seed domain and a candidate domains that has a similarity score exceeding the dynamically-generated threshold is dropped or otherwise eliminated from further processing and only pairs that have a similarity score not exceeding a corresponding threshold are provided to a downstream computing facility 170 and/or presented to a user through a UI generated by an interface module 160.

In some embodiments, domain processing system 180 may operate on a computer operating in an enterprise computing environment or on multiple computers in a distributed computing environment. For example, domain filter 140 may be embodied on a mobile device, a laptop computer, a tablet computer, or any suitable data processing system, while data processor 120, Internet domain database 130, interface module 140, seed domain database 150, and downstream computing facility 170 may be embodied on the same or different computers separate from domain filter 140. In such a distributed computing environment, seed domain database 150 may reside on a server machine. In such a case, domain filter 140 may obtain a seed domain 155 from seed domain database 150 over a secure network connection (e.g., over a private network).

In some embodiments, domain filter 140 may process, in a computer memory, a set of candidate domains 135 against each seed domain 155 stored in seed domain database 150. This processing can be referred to as a job (e.g., a scheduled processor job for processing a seed domain).

Figure 2:
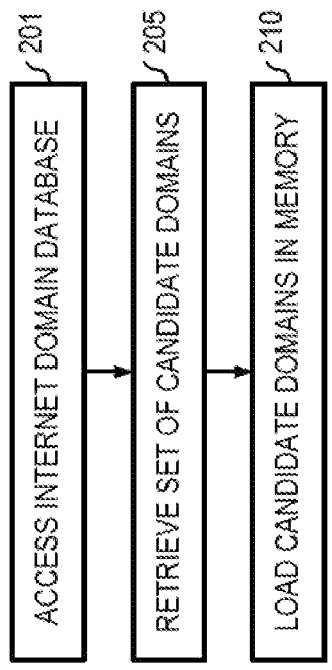
FIG. 2 is a flow chart illustrating a process for processing candidate domains according to some embodiments.

In some embodiments, a job can include loading a pair of character strings in a computer memory, with one of the character strings representing a seed domain and the other representing a candidate domain. FIG. 2 is a flow chart illustrating a process for processing candidate domains according to some embodiments disclosed herein.

Figure 3:
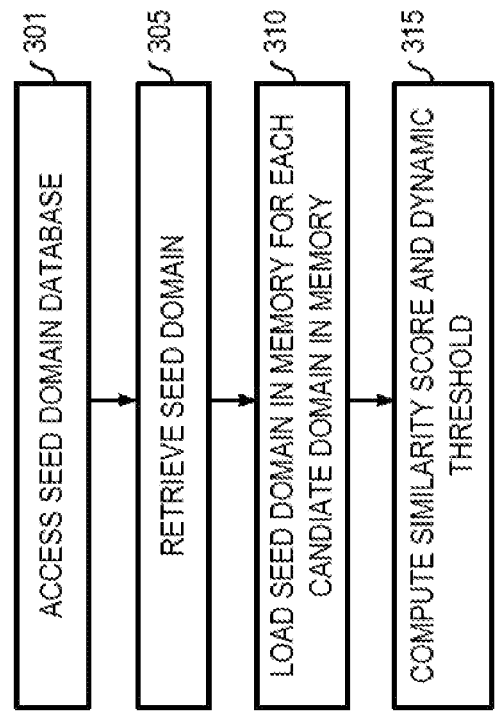
FIG. 3 is a flow chart illustrating a process for processing seed domains according to some embodiments.

In the example of FIG. 2, a job 200 may include accessing an Internet domain database (201), retrieving a block or set of candidate domains from the Internet domain database (205), and loading a character string of a candidate domain thus retrieved in a computer memory (e.g., of a computing device such as a mobile device, a laptop computer, a tablet computer, etc.) (210). In some embodiments, retrieving a block or set of candidate domains from the Internet domain database may entail reading character strings stored in a block of rows (e.g., rows 1-100) of the Internet domain database. Referring to FIGS. 2 and 3, in some embodiments, job 200 may take place concurrently with job 300, or job 300 may take place before job 200. In the latter case, character strings for a block of seed domains can be loaded in the computer memory before job 200 is started.

In the example of FIG. 3, a job 300 may include accessing a seed domain database (301) and retrieving a seed domain (e.g., an URL) from the seed domain database (305). The URL may include a character string which can contain text, number(s), or a combination thereof (i.e., alphanumerical). Accordingly, job 300 may further include obtaining a character string of the seed domain thus retrieved and storing the character string of the seed domain in the computer memory (310). Once the character string of the seed domain and the character string of the candidate domain are loaded in the computer memory, job 300 may proceed to compute a similarity score and a dynamic threshold for the pair loaded in the computer memory (315). This computation is further described below with reference to FIG. 4.

Figure 4A:
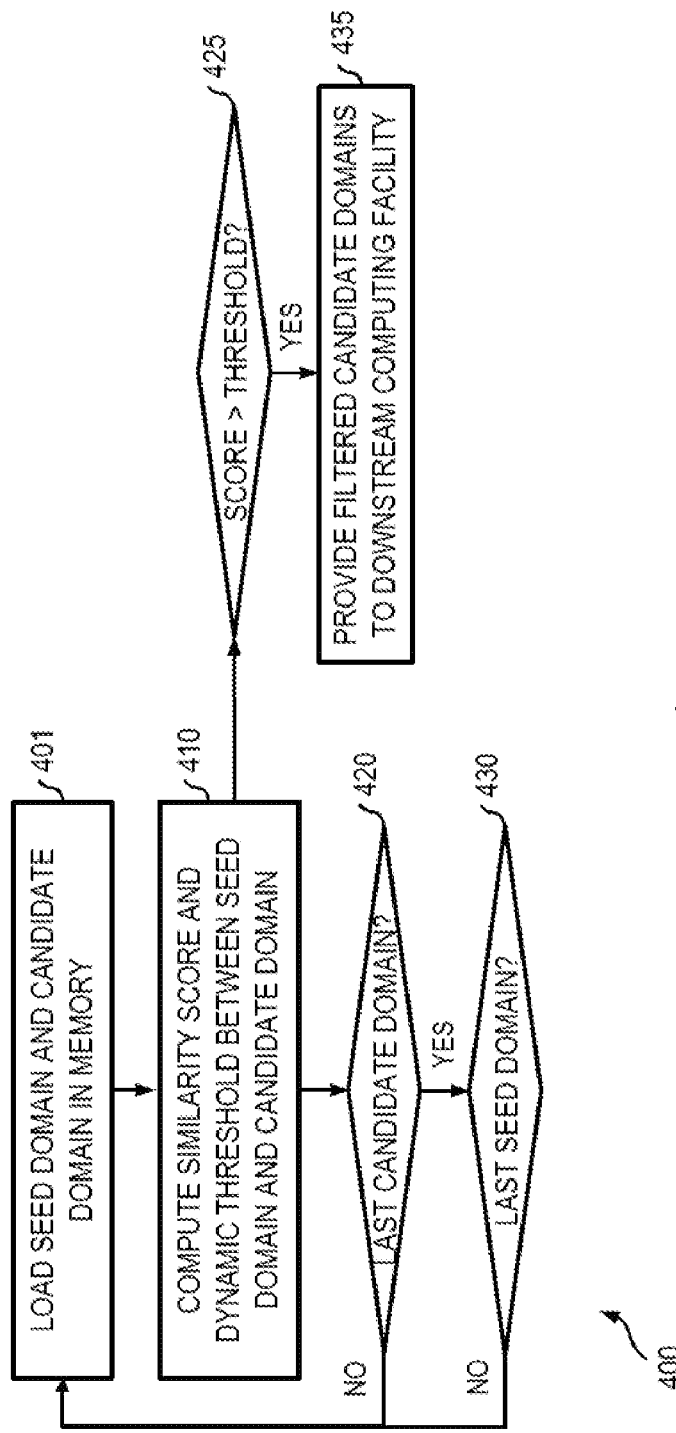
FIG. 4A is a flow chart illustrating an example of a domain processing method according to some embodiments.

FIG. 4A is a flow chart illustrating an example of a domain processing method 400 according to some embodiments. Skilled artisans understand that there are many ways that a candidate domain can be similar to a seed domain. For example, a candidate domain may contain a seed domain or can be some version or variation of the seed domain. As an example, suppose a seed domain is "mycompany.com," candidate domains may contain the seed domain "mycompany.com," for instance, "mmycompany.com," "mycompany.net," etc. in their names. As another example, some candidate domains may use "3" to substitute the letter "e" in a domain name, or use the number "1" or the letter "l" for an uppercase "i." These homoglyph substitutes and alterations cannot be easily identified.

Suppose a seed domain is "wellsfarm.com" and a candidate domain is "w3llsfarm.com." In the example of FIG. 4A, a domain filter implementing domain processing method 400 may load character strings representing this pair of domains in a computer memory of a computing device running the domain filter (401), compute a similarity score and a corresponding threshold for the pair (410), determining whether the similarity score exceeds the threshold (425), and, if so, providing the pair of domains to a downstream computing facility or holding the pair of domains in a collection until the job (e.g., per seed domain) is completed (435). For each seed domain, these steps are iterated for each of the candidate domains retrieved from the candidate domain database and check the availability of candidate domains (420). The entire process can be iterated for each of a plurality of seed domains retrieved from the seed domain database and check the availability of seed domains (430).

Figure 4B:
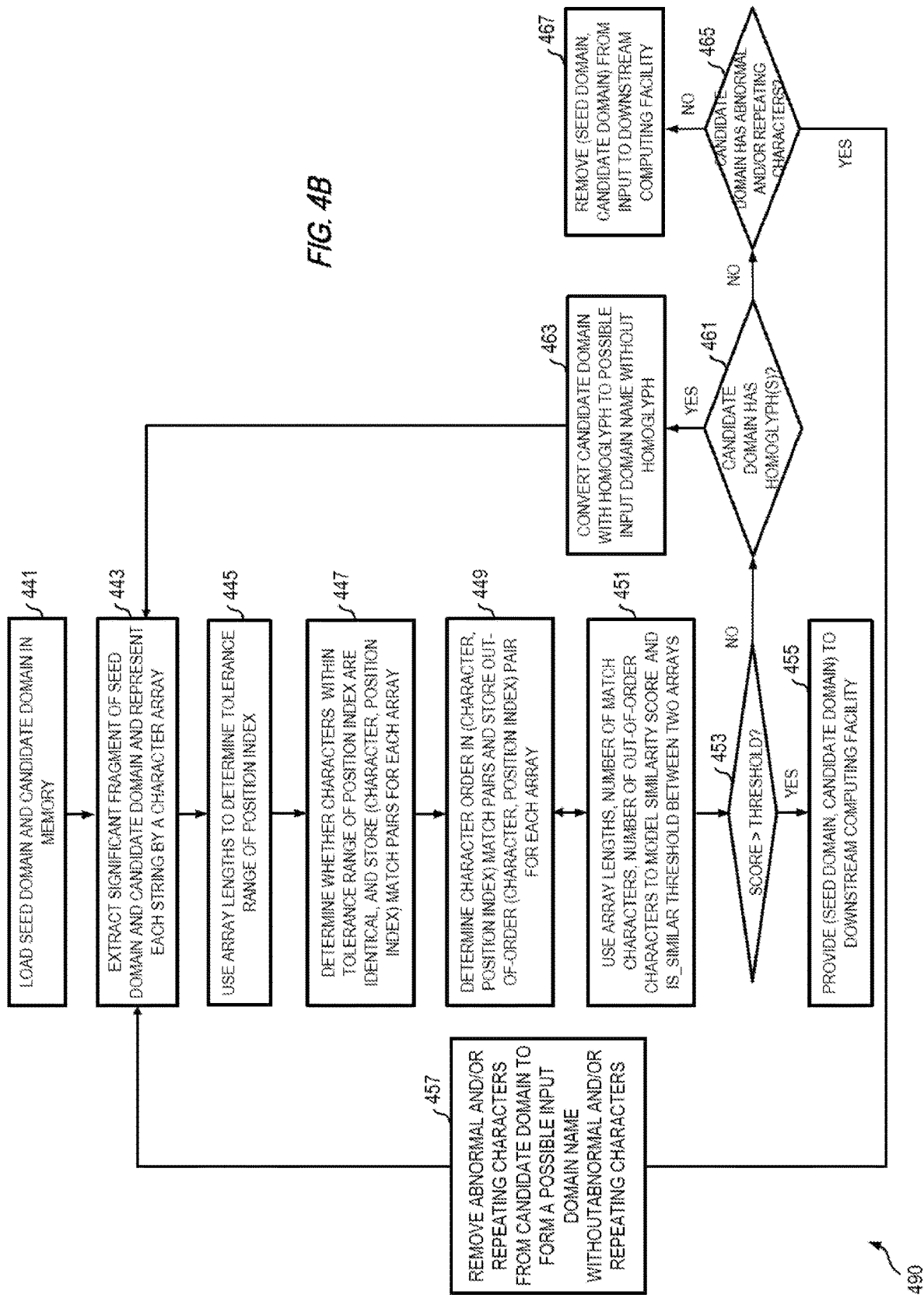
FIG. 4B is a flow chart illustrating an example of a similarity scoring and dynamic thresholding process for domain processing according to some embodiments.

FIG. 4B is a flow chart illustrating an example of a similarity scoring and dynamic thresholding process 490 according to some embodiments. Once a seed domain character string (e.g., "wsj.com") and a candidate domain string (e.g., "vvsj.com") are loaded in memory (441), a domain filter implementing process 490 may extract a significant fragment from each of the seed domain character string (e.g., "wsj") and the candidate domain string (e.g., "vvsj") and represent each string thus extracted via a character array (e.g., [w s j], [v v s j]) (443).

In some embodiments, the domain filter can use the array lengths (e.g., 3, 4) to determine a tolerance range of a position index (e.g., "w" is at position 0, "s" is at position 1, "j" is at position 2, then the position index for the seed domain is 0="w"; 1="s"; 2="j") (445). The domain filter can then determine whether the characters within the tolerance range of the position index are identical and store the matching character and the position index for each array (447). The domain filter can also determine the order of the matching characters and store the character order information (449). In this example, characters "sj" match, have the same order, and their position indexes (1, 2) and (2, 3) are within the tolerance range of 1. The pair of seed domain character string and candidate domain character string is still not considered similar enough because of a relatively high threshold due to short string lengths. However, after the homoglyph substitutes from vv to w (463), the similarity score becomes much higher and, therefore, the domain filter passes the pair for further processing.

As another non-limiting example, suppose a seed domain character string is "sun" and a candidate domain character string is "san," then arrays [s u n] and [s a n] each has "s" at the position index 0 and "n" at the position index 2. Thus, in this case, the pair of seed domain character string and candidate domain character string has two matching characters (e.g., "s" and "n") at two matching positions. Here, the array lengths are short—only three characters long for each string. Accordingly, the tolerance range is low and is_similar threshold is high. Even though two out of three characters in the pair of seed domain character string and candidate domain character string match and have matching positions, the pair of seed domain character string and candidate domain character string is still not considered similar or close enough and no further processing is necessary.

A goal of this invention is to, as a first-pass domain filter, quickly and significantly reduce the number of candidate domains that would need to be further processed with respect to a seed domain in a domain discovery pipeline or process. To this end, a relatively small amount of false positives are not a main concern for the first-pass domain filter. Rather, the first-pass domain filter takes into account the number of matching characters, the character order (transposition), and the lengths of the seed domain character string and the candidate domain character string in determining a similarity score. For instance, "san" and "ans" have a match order of two because two characters "an" are matched and present in both strings, in the correct order, and have the same character lengths. The first-pass domain filter can then use the similarity score thus computed to determine whether the seed domain character string and the candidate domain character string are similar.

The tolerance range is configurable and/or a function of two input strings, and can vary from implementation to implementation. Generally, the longer the array length (or character string length), the higher the tolerance range might be. The larger string length ratio (i.e., short string length/long string length), the smaller the tolerance range might be. For instance, if a seed domain has a character length of 7 and a candidate domain has a character length of 14, and the two character strings may have four matching characters at four positions. If the same seed domain has string length 7 and a candidate domain with string length 8 is a subset of the original 14-character string containing the four matching characters, the two character strings may only have two matching characters at two positions since its tolerance range is smaller. The ability for the domain filter to make this determination can be achieved through modeling.

More specifically, in some embodiments, the first-pass domain filter is modeled to perform similarity scoring as well as dynamic thresholding, both of which are based on the input strings and some derived features which are computed dynamically. In some embodiments, the first-pass domain filter model can take the following as input variables for the similarity scoring: character match count, count of matched characters out of order, (seed domain) string length 1, (candidate domain) string length 2.

The string lengths are used to determine a dynamic threshold for the two strings under comparison (451). If the similarity score exceeds the dynamically generated threshold (453), then the pair of seed domain character string and candidate domain string are considered as similar, related, or close enough for further processing (e.g., by a downstream computing facility) (455). If the similarity score does not exceed the dynamically generated threshold, the pair of seed domain character string and candidate domain string can be dropped from further consideration or can undergo further analyses (461).

In this case, as illustrated in FIG. 4B, if the similarity score does not exceed the dynamically generated threshold, the domain filter may further analyze the candidate domain character string and determine whether the candidate domain character string contains any homoglyph. A homoglyph is one of two or more graphemes, characters, or glyphs with shapes that appear identical or very similar. In the above example, "vv" can be considered a homoglyph of "w". Further, the number "3" can be considered a homoglyph of the letter "e" in a domain name, the number "1" or the letter "l" can be considered a homoglyph of an uppercase "i" and "z00" can be considered a homoglyph of "zoo". In some embodiments, the first-pass domain filter disclosed herein is configured for identifying such homoglyphs and, when found, converting a candidate domain character string with a homoglyph to one without a homoglyph (463) and looping back to process the converted candidate domain character string with the seed domain again (443).

In some embodiments, the first-pass domain filter may further analyze the candidate domain character string even if it does not contain a homoglyph. For instance, the first-pass domain filter may determine whether the candidate domain character string contains abnormal and/or repeating characters (e.g., "yy" and "pppp" in the example payyppppal) (465). If so, then the first-pass domain filter may remove the abnormal and/or repeating characters, form a possible input string without the abnormal and/or repeating characters (e.g., "paypal"), and loop back to process the modified candidate domain character string with the seed domain again (443). Otherwise, the pair of the seed domain character string and candidate domain character string are removed as input to a downstream computing facility (467).

Examples of a computing facility downstream from the first-pass domain filter can include, but are not limited to, a UI of domain processing system 180 that is generated by interface module 160 and presented on a user device, an edit distance analyzer that computes edit distance or Levenshtein Distance to determine a degree of similarity between a seed domain and a filtered candidate domain, an analytical module running on a computer operating in an enterprise computing environment that is operable to analyze the seed domain and the filtered candidate domain, and/or other types of domain filters, etc.

In some embodiments, candidate domains 135 stored in Internet domain database 130 can include real domains (e.g., registered domains) and test domains (e.g., registered or unregistered domains for testing purposes). Test domains may be created based on variations of a seed domain that someone may obtain as domains.

FIG. 5 shows non-limiting examples of similarity scores and corresponding dynamic thresholds dynamically generated according to some embodiments. Following the example, described above, a first-pass domain filter may generate a similarity score 500 for a pair of a seed domain character string "wsj" and a candidate domain character string "vvsj" and a corresponding dynamic threshold 501. In this case, similarity score 500 exceeds dynamic threshold 501, thus, the first-pass domain filter returns a result "true," which indicates that the pair of the seed domain character string "wsj" and the candidate domain character string "vvsj" has passed the similarity test and can proceed to be processed by a downstream computing facility.

For comparison, FIG. 5 also shows a pair of a seed domain character string "vha" and a candidate domain character string "mizunova". Although there are two characters "v" and "a" in common, their positions are out of the tolerance range and thus are not considered as matched characters. In this case, a first-pass domain filter may generate a similarity score 510 and a corresponding dynamic threshold 511 and determine that, since similarity score 510 did not exceed dynamic threshold 511, the pair does not pass the similarity test. Since dynamic threshold 511 is dynamically generated based on the input strings, it is not the same as dynamic threshold 501 for a different pair of input strings.

In some embodiments, a first-pass domain filter disclosed herein can significantly reduce the time and cost of resources needed by a downstream computing facility. Accordingly, in some embodiments, a first-pass domain filter disclosed herein can be used as a pre-processor in a domain ingestion and detection pipeline.

In such a domain ingestion and detection pipeline, the first-pass domain filter can be implemented as the first module that processes all candidate domains known to the underlying system (e.g., domains collected, directly from a domain registrar and/or indirectly through a WHOIS lookup service, and stored in a central database maintained or otherwise accessible by the system) against a seed domain, that determines a similarity score and a dynamic threshold, and that filters the entire corpus of candidate domains based on their respective similarity scores and dynamic thresholds. The candidate domains that met the dynamic thresholds can be passed onto to a downstream computing facility in the domain ingestion and detection pipeline.

In the domain ingestion and detection pipeline, in addition to the first-pass domain filter, there can be a series of modules that further filter down the already significantly reduced list of candidate domains. An example of this process 600 is illustrated in FIG. 6.

Figure 6:
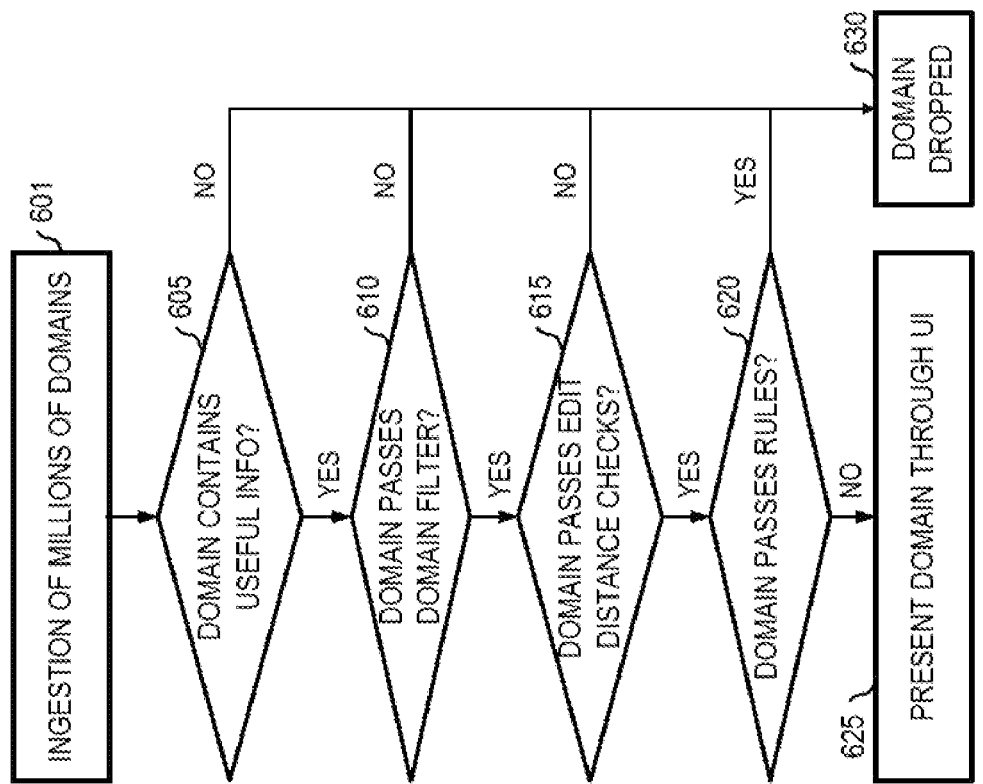
FIG. 6 is a flow chart illustrating an example of a domain ingestion and detection method with domain filtering according to some embodiments.

As exemplified in FIG. 6, input data comprising millions of candidate domains can be ingested (e.g., through the WHOIS input data) into a domain ingestion and detection pipeline (601). The input data can go through a formality check to make sure that the information contained in the input data is indeed useful to the system (605). If the format for the input data is incorrect (e.g., it cannot be read, it is empty, or it contains unnecessary fields), it is dropped (630).

If the input data passes the formality check, it is passed onto a first-pass domain filter (610). The first-pass domain filter is operable to significantly reduce the millions of candidate domains in the input data to a fraction thereof through a dynamic thresholding process described above.

Candidate domains that do not pass the first-pass domain filter are dropped (630). In the example of FIG. 6, candidate domains that do pass the first-pass domain filter are provided to an edit distance module (615). The edit distance module can use techniques such as Levenshtein distance, bitsquatting, homoglyphs and "l33t speak" (leetspeak refers to an alternate representation of text that replaces letters with numbers or character combinations, for instance, "leet" is spelled as "l33t"), confusables, transposition, keyboard proximity, vowel swap, repetition, and hyphenation normalization to discern whether a seed domain is related to a candidate domain and thus is worth further processing. This is referred to as edit distance checks.

Candidate domains that pass the edit distance checks are passed to a social engineering module (620). The social engineering module is operable to apply social engineering rules to the candidate domains and determine whether common key terms (e.g., social engineering terms) are more likely to trigger false-positives. The social engineering module may segment words in a domain and determine whether there are whitelist terms to reduce false positives.

The social engineering terms can be determined by clustering techniques. In some embodiments, the social engineering terms can provide a feedback loop to a first-pass domain filter so that the next time a candidate domain containing the social engineering terms will not pass the first-pass domain filter.

Candidate domains that do not pass the social engineering rules are dropped (630). Candidate domains that do pass the social engineering rules can be presented on a UI (625).

In some embodiments, one of the modules in the domain ingestion and detection pipeline can create features around a candidate domain outputted from the first-pass domain filter. Examples of features thus created can include an indication on whether a seed domain is contained in the candidate domain, the edit distance (which represents how many characters that must be replaced, added, or inserted into a candidate domain in order to change it to the candidate domain), etc. Each module can analyze a candidate domain and set flags accordingly.

In this way, a first-pass domain filter disclosed herein can quickly and significantly reduce the number of candidate domains that the domain ingestion and detection pipeline usually would have to analyze and process to determine how similar they actually are to a seed domain. Since the analytics are computationally expensive, reducing the number of candidate domains can significantly reduce the computational power needed to process the candidate domains and greatly increase the efficiency of the domain ingestion and detection pipeline.

Figure 7:
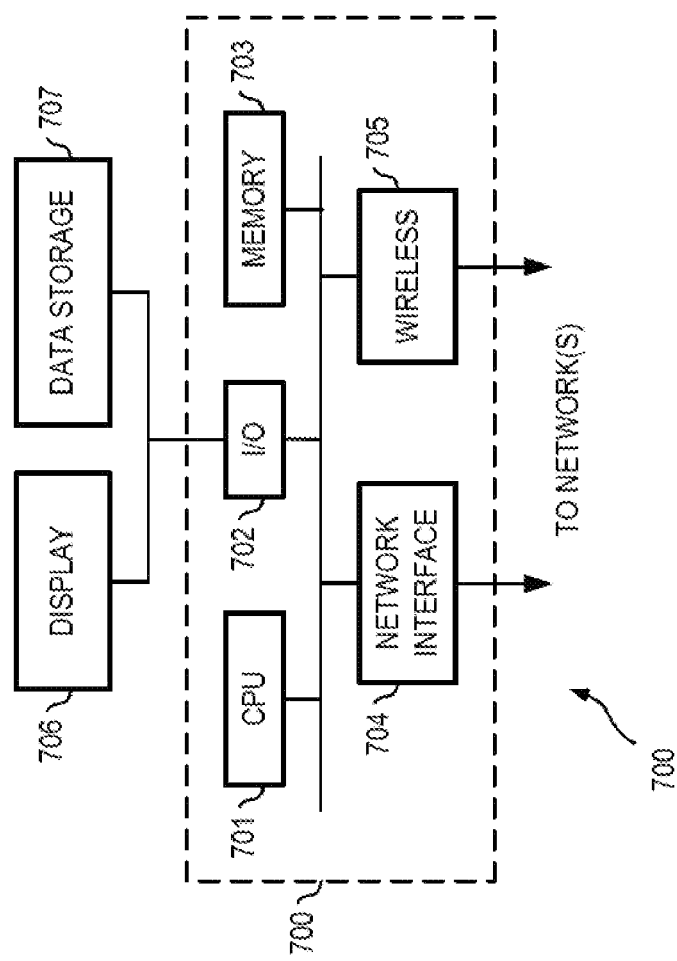
FIG. 7 depicts a diagrammatic representation of a data processing system for implementing a system according to some embodiments.

FIG. 7 depicts a diagrammatic representation of a data processing system for implementing a system for domain filtering. As shown in FIG. 7, data processing system 700 may include one or more central processing units (CPU) or processors 701 coupled to one or more user input/output (I/O) devices 702 and memory devices 703. Examples of I/O devices 702 may include, but are not limited to, keyboards, displays, monitors, touch screens, printers, electronic pointing devices such as mice, trackballs, styluses, touch pads, or the like. Examples of memory devices 703 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 700 can be coupled to display 706, information device 707 and various peripheral devices (not shown), such as printers, plotters, speakers, etc. through I/O devices 702. Data processing system 700 may also be coupled to external computers or other devices through network interface 704, wireless transceiver 705, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet.

In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively or additionally, the computer-executable instructions may be stored as software code components on a direct access storage device array, magnetic tape, floppy diskette, optical storage device, or other appropriate computer-readable medium or storage device.

Any suitable programming language can be used to implement the routines, methods, or programs of embodiments of the invention described herein, including C, C++, Java, JavaScript, HyperText Markup Language (HTML), Python, or any other programming or scripting code. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved in many ways. For example, distributed or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for domain processing, the method comprising:

for each respective candidate domain of a plurality of candidate domains:

comparing, by a computer, a seed domain and the respective candidate domain, the comparing including a character match count, a first string length of the seed domain, and a second string length of the respective candidate domain;

generating, by the computer, a similarity score based on the character match count, the first string length of the seed domain, and the second string length of the respective candidate domain;

computing, by the computer, a dynamic threshold based on the first string length of the seed domain and the second string length of the respective candidate domain;

determining, by the computer, whether the similarity score exceeds the dynamic threshold; and responsive to the similarity score not exceeding the dynamic threshold, removing the respective candidate domain from the plurality of candidate domains.

2. The method according to claim 1, further comprising:
prior to removing the respective candidate domain from the plurality of candidate domains, analyzing a character string of the respective candidate domain, the analyzing including determining whether the character string contains any homoglyph and, if any homoglyph is found, converting the character string to a converted candidate domain without any homoglyph and processing the converted candidate domain as one of the plurality of candidate domains.

3. The method according to claim 1, wherein the seed domain is one of a plurality of seed domains and wherein the comparing, the generating, the computing, the determining, and the removing are performed for each pair of a seed domain of the plurality of seed domains and a candidate domain of the plurality of candidate domains.

4. The method according to claim 1, wherein the comparing further includes a count of matched characters out of order.

5. The method according to claim 1, further comprising:
retrieving the plurality of candidate domains from a database.

6. The method according to claim 1, further comprising:
storing the similarity score and the dynamic threshold in a computer memory.

7. The method according to claim 1, wherein each of the plurality of candidate domains represents a registered domain on the Internet.

8. A system for domain processing, the system comprising:

a processor;

a non-transitory computer-readable medium; and instructions stored on the non-transitory computer-readable medium and translatable by the processor for:

for each respective candidate domain of a plurality of candidate domains:

comparing a seed domain and the respective candidate domain, the comparing including a character match count, a first string length of the seed domain, and a second string length of the respective candidate domain;

generating a similarity score based on the character match count, the first string length of the seed domain, and the second string length of the respective candidate domain;

computing a dynamic threshold based on the first string length of the seed domain and the second string length of the respective candidate domain;

determining whether the similarity score exceeds the dynamic threshold; and responsive to the similarity score not exceeding the dynamic threshold, removing the respective candidate domain from the plurality of candidate domains.

9. The system of claim 8, wherein the instructions are further translatable by the processor for:

prior to removing the respective candidate domain from the plurality of candidate domains, analyzing a character string of the respective candidate domain, the analyzing including determining whether the character string contains any homoglyph and, if any homoglyph is found, converting the character string to a converted candidate domain without any homoglyph and processing the converted candidate domain as one of the plurality of candidate domains.

10. The system of claim 8, wherein the seed domain is one of a plurality of seed domains and wherein the comparing, the generating, the computing, the determining, and the removing are performed for each pair of a seed domain of the plurality of seed domains and a candidate domain of the plurality of candidate domains.

11. The system of claim 8, wherein the comparing further includes a count of matched characters out of order.

12. The system of claim 8, wherein the instructions are further translatable by the processor for:

retrieving the plurality of candidate domains from a database.

13. The system of claim 8, wherein the instructions are further translatable by the processor for:

storing the similarity score and the dynamic threshold in a computer memory.

14. The system of claim 8, wherein each of the plurality of candidate domains represents a registered domain on the Internet.

15. A computer program product for domain processing, the computer program product comprising a non-transitory computer-readable medium storing instructions translatable by a processor for performing, for each respective candidate domain of a plurality of candidate domains:

comparing a seed domain and the respective candidate domain, the comparing including a character match count, a first string length of the seed domain, and a second string length of the respective candidate domain;

generating a similarity score based on the character match count, the first string length of the seed domain, and the second string length of the respective candidate domain;

computing a dynamic threshold based on the first string length of the seed domain and the second string length of the respective candidate domain;

determining whether the similarity score exceeds the dynamic threshold; and responsive to the similarity score not exceeding the dynamic threshold, removing the respective candidate domain from the plurality of candidate domains.

16. The computer program product of claim 15, wherein the instructions are further translatable by the processor for:

prior to removing the respective candidate domain from the plurality of candidate domains, analyzing a character string of the respective candidate domain, the analyzing including determining whether the character string contains any homoglyph and, if any homoglyph is found, converting the character string to a converted candidate domain without any homoglyph and processing the converted candidate domain as one of the plurality of candidate domains.

17. The computer program product of claim 15, wherein the seed domain is one of a plurality of seed domains and wherein the comparing, the generating, the computing, the determining, and the removing are performed for each pair of a seed domain of the plurality of seed domains and a candidate domain of the plurality of candidate domains.

18. The computer program product of claim 15, wherein the comparing further includes a count of matched characters out of order.

19. The computer program product of claim 15, wherein the instructions are further translatable by the processor for:

retrieving the plurality of candidate domains from a database.

20. The computer program product of claim 15, wherein the instructions are further translatable by the processor for:

storing the similarity score and the dynamic threshold in a computer memory.

\* \* \* \* \*